United States Patent

Holmes

[15] 3,645,609
[45] Feb. 29, 1972

[54] ACCESSORY MOUNTING MECHANISM FOR A MICROSCOPE

[72] Inventor: Robert W. Holmes, Perinton, N.Y.
[73] Assignee: Bausch & Lomb Incorporated, Rochester, N.Y.
[22] Filed: June 22, 1970
[21] Appl. No.: 48,152

[52] U.S. Cl. ...................................................350/91
[51] Int. Cl. ...........................................G02b 21/06
[58] Field of Search.......................................350/91

[56] References Cited

UNITED STATES PATENTS 2,138,665   11/1938   Ott............................................350/91 X
3,237,519   3/1966   Pettavel et al. ........................350/91 X

FOREIGN PATENTS OR APPLICATIONS 396,325   8/1933   Great Britain...........................350/91

Primary Examiner—David Schonberg
Assistant Examiner—Toby H. Kusmer
Attorney—Frank C. Parker

[57] ABSTRACT

A groove, or pocket, is formed between two members for holding an optical head of a microscope and a tab member fits lockably into the pocket so formed, for retaining a microscope accessory. At least one of the two pocket-defining members is demountable. Means may be employed to adjust the angular position of said accessory.

3 Claims, 6 Drawing Figures

ROBERT W. HOLMES
*INVENTOR.*

BY *Frank C. Parker*

ATTORNEY

PATENTED FEB 29 1972

ROBERT W. HOLMES
INVENTOR.

BY *Frank C. Parker*

ATTORNEY

ACCESSORY MOUNTING MECHANISM FOR A MICROSCOPE

BACKGROUND OF THE INVENTION

1. Field of the Invention

The invention concerns apparatus for holding accessories onto microscopes by a mechanical interrelationship with the microscope support mechanism.

2. DESCRIPTION OF THE PRIOR ART

Typically, microscope accessories are mounted on bases of their own and stand to one side of the microscope, thereby tending to clutter the microscopist's work space.

Several attachment means are known for hanging accessories directly onto microscopes and their support apparatus. These include tapped holes for attaching apparatus by machine screws, clips, hooks, spring forks with cooperative detents and harnesses which drop over the microscope. The available means, however, are deficient to greater or lesser degree in at least one of these qualities which are desirable in apparatus for mounting microscope accessories: strength, durability, simplicity, attractiveness, versatility, convenience of use, quick mounting and demounting, low cost, light weight, reliability and safety.

Being mindful of these attributes I have invented a novel accessory mounting mechanism combining them.

SUMMARY OF THE INVENTION

Certain well-known microscopes comprise an optical head which may be supported by a variety of modular support apparatus among which are brackets for receiving the optical head. According to my invention I cause a pocket to be formed between the bracket and the optical head or between the bracket and some other member, there being a lip, or flange, at the outer edge of the pocket. A cooperative tab is formed on an accessory mounting member, the tab extending into the pocket and locking against the lip, or flange. Since at least one of the pocket-forming members is readily demountable the tab and its attendant accessory can be quickly removed. The accessory may be attached to the accessory mounting member by any suitable means, as a close-fitting hole therein. One version of my invention includes an accessory mounting member having a portion near the tab formed thinner than the remainder so that the thin portion may be flexible to act as a hinge. Such a member is made of a material chosen for its long flex-life characteristics. In one version of my invention I additionally cause a screw, threaded through a cooperating aperture in the accessory mounting member to bear against the microscope support structure, the screw being adjustable for varying the angle of the accessory relative to the microscope. In another version the accessory mounting member, having the usual locking tab, defines a tapped and threaded hole by means of which a multitude of accessories might be screwed onto the accessory mounting member. The pocket may be elongated and curvilinear when seen in plan view so that the tab can slide along the lip for readily changing the position of the accessory. In one configuration, the groove extends most of the way around the microscope permitting a wide variation in the azimuthal relationship of the accessory to the object being viewed.

DESCRIPTION OF THE PREFERRED EMBODIMENTS

Figure 1:
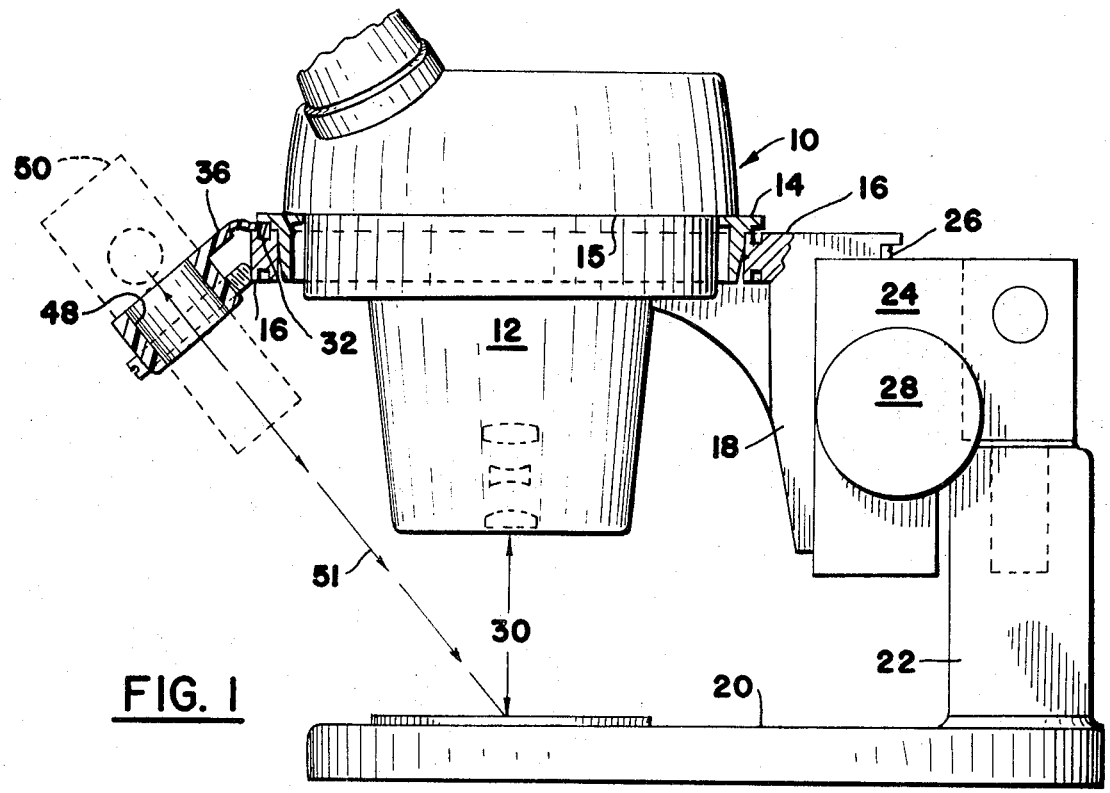
FIG. 1 is an elevation view, partly in section, of a stereomicroscope held in support apparatus adapted for use with my invention.

The microscope 10 shown in FIG. 1 is a well-known stereomicroscope whose optical head 12 is of a peculiar shape adapted to be demountably received in a microscope receiving bracket 14 which is held by a ringlike member 16. Bracket 14 defines an interior aperture whose peculiar shape corresponds to that of the optical head 12, whose rim 15 seats on the top of bracket 14. The exterior of bracket 14 is cooperative with ringlike member 16, and when both are round, optical head 12 may be rotated about its vertical axis within ringlike member 16. The ringlike member 16 is held by arm support 18. The microscope rests on base 20 to which is affixed stand 22. Arm support 18 is slidably fitted for vertical adjustment within support member 24 by means of rack 26 which cooperates with an interior pinion controlled by knob 28. Rotation of knob 28 results in adjustment of the focus of the microscope and in changing the working distance 30 of the instrument.

Figure 3:
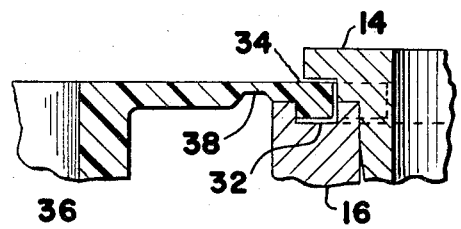
FIG. 3 is an enlarged sectional view showing how the tab of my accessory mounting member fits into the pocket.
Figure 2:
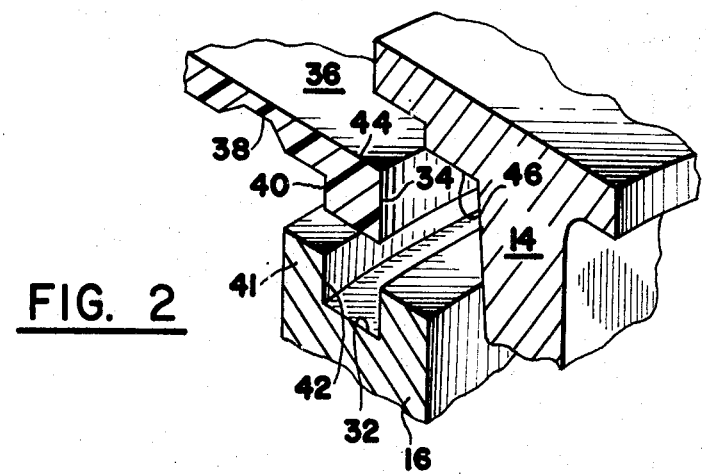
FIG. 2 is a perspective view partly in section showing the pocket-forming members and tab of my inventions.

As seen in FIGS. 1, 2 and 3, ringlike member 16 has indentation 32 formed in its upper and lower surfaces. Tab 34 is a flange formed at an extremity of the accessory mounting module 36. Some versions of the module 36 may be formed with a thin portion, or hinge, 38 for a purpose which will shortly be explained. Face 40 of the tab 34 is formed cooperatively with face 42 of the flange or lip 41 formed on ringlike member 16. The top 44 of tab 34 is formed cooperatively with the bottom of rim 46 of microscope receiving bracket 14.

The indentation 32 may be formed continuously, or nearly so, about both the upper and lower surfaces of the ringlike member 16. Thus, the accessory mounting module 36 may be moved along the groove for the purpose of varying the azimuth angle from whence the accessory might bear upon the microscope. The tab 34 will normally be mounted in the indentation 32 in the upper surface of ringlike member 16. Both the upper and the lower surfaces are provided with such indentations, however, for the mounting of accessories when either the ringlike member 16 or the entire mounted microscope assembly may be inverted, as some uses of the microscope may require.

Figure 4:
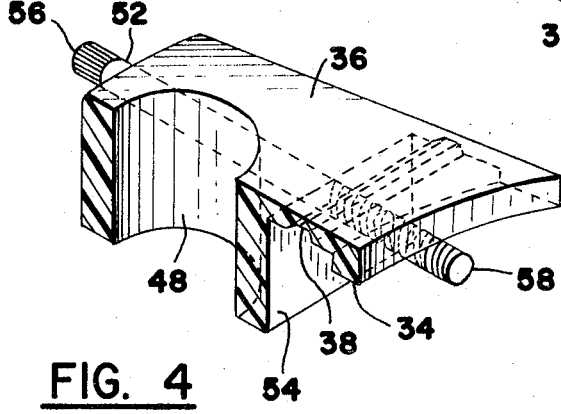
FIG. 4 is an oblique pictorial view, partly in section showing an adjustable screw which may be employed to vary the angular position of an accessory.

Accessory mounting module 36 may employ any of a variety of means for holding a microscope accessory, for example, the bore 48 as seen in FIGS. 1 and 4 holds an accessory, such as a Nicholas Illuminator 50 shown in phantom lines in FIG. 1.

Many microscope accessories must be angularly aligned (with respect to the horizontal plane) to the microscope, especially if they are to exert some effect on the subject of observation. It is, therefore, important to provide a suitable means for angularly adjusting the accessory's axis, as for instance axis 51 of the illuminator 50. Accordingly, hinge 38 is provided in accessory mounting module 36 to permit the accessory to be rotated for angular adjustment.

Hinge 38 may be formed by a molding process or it may be coined into the material from which the accessory mounting module is made. The flex-life of the hinge will be prolonged if the process by which it is formed results in the hinge-forming molecules being oriented for greater strength. I have found that polypropylene is a suitable material when molded. A hinge may also be coined in polypropylene as well as in certain nylon and acetal resins.

In order to provide positive control of the angular rotation of the accessory I have provided adjusting screw 52 threadedly engaged through an aperture in the front wall 54 of module 36. Knurled portion 56 is provided on the screw 52 for rotation of the screw 52. The tip 58 of the screw 52 bears against the outer edge of ringlike member 16. It may now be seen that the weight of an accessory imparts a downward and inward force upon module 36 which is adjustably opposed by screw 52. By adjusting the position of screw 52 it may be seen that the axis 51 of the accessory may be brought to bear directly upon the subject of examination, and that the axis 51 may be readily readjusted in the event that the working distance 30 must be changed.

Figure 5:
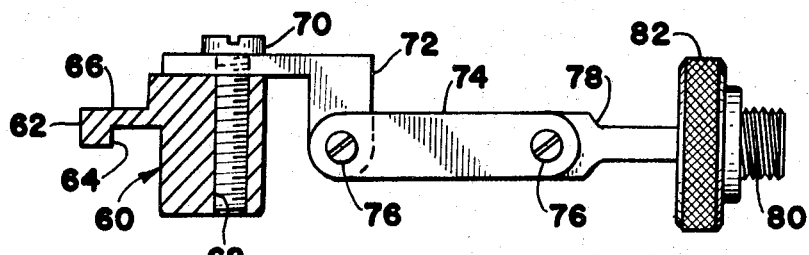
FIG. 5 is a sectional view of another embodiment of my invention.

In another embodiment of my invention, shown in FIG. 5, an accessory mounting module 60 has a tab 62 formed with faces 64 and 66 corresponding respectively to the faces 40 and 44 of FIG. 2, and being for the same purpose. An aperture 68 is defined by the body of module 60, for receiving a member, such as bolt 70 to which is connected well-known linking support mechanism.

It is the function of the bolt 70 to retain support member 72 which may be pivotal about bolt 70. Link 74 is adjustably connected to its neighbors by a suitable pivotal means such as screws 76 which may be releasably tightened for adjusting the angular relationships of link 74 and its neighbors. Mount 78 is formed with threaded portion 80 to connect with a suitable tapped hole in an accessory to be mounted thereon. Means for gripping the mount 78 is provided by knurled portion 82.

Thus, it may be seen that accessory mounting module 60 may be engaged in the same kind of pocket formed by the face 42 and the rim 46, respectively, of the member 16 and the bracket 14 as seen in FIG. 2.

Figure 6:
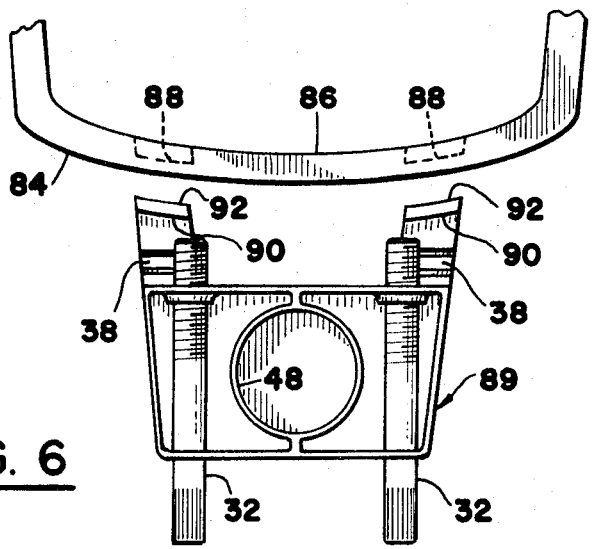
FIG. 6 is a bottom view of another embodiment of my invention.

By no means all apparatus for receiving an optical head of a microscope is conveniently formed with a plurality of members such as bracket 14 and member 16, and instead, the optical head may be mounted directly in a bracket having a shape conformal thereto. A fragment of such a bracket is shown as numeral 84 in FIG. 6, with the side 86 being conformal to the shape of the optical head. Indentations 88 are formed in the side 86 to cooperate with the faces 90 of tabs 92 of the accessory mounting module 89 in the same way as the face 40 cooperates with the face 42 of FIG. 2. When the optical head is seated in the bracket 84, the rim 15 holds the tabs 92 in place in the same way as the rim 46 of FIG. 2. Other portions of the module 89 correspond to similarly numbered parts of the module 36.

I claim:

1. Accessory mounting apparatus for a microscope including base, stand, arm support and optical head members, said apparatus comprising:
    a ringlike member defining with an annular lip a substantially continuous annular indentation in at least one of its upper and lower surfaces and having an annular interior surface, said ringlike member being cooperative with said arm support member for supporting said optical head member;
    a microscope receiving bracket having means on its interior for supportably receiving said optical head member and having annular means on its exterior for being supportably received by said annular interior surface of said ringlike member, said bracket having a substantially continuous flange cooperative with one of said indentations of said ringlike member to define therebetween a substantially continuous annular cavity characterized by an opening portion defined between said lip and said flange more narrow than its interior portion; and
    an accessory mounting module having means for retaining a microscope accessory and further having an extension ending in an enlarged portion connected to said extension by a neck portion more narrow than said enlarged portion, said enlarged portion being of a shape conformal to a short section of said annular cavity and being lockably and slidably receivable within said annular cavity.

2. The apparatus of claim 1 wherein said extension of said accessory mounting module is flexible for varying an angular relationship to said optical head member, of an accessory carried by said module.

3. The apparatus of claim 2 further comprising screw means bearable against said ringlike member for adjusting said angular relationship.

* * * * *